United States Patent [19]

Andoh

[11] 4,332,628

[45] Jun. 1, 1982

[54] SELECTIVE ABSORBER OF SOLAR ENERGY AND PROCESS FOR PRODUCING SAME

[75] Inventor: Makoto Andoh, Nagoya, Japan

[73] Assignee: Sumitomo Light Metal Industries, Ltd., Tokyo, Japan

[21] Appl. No.: 232,228

[22] Filed: Feb. 6, 1981

[30] Foreign Application Priority Data

Feb. 20, 1980 [JP] Japan .................................. 55-19853

[51] Int. Cl.$^3$ ............................. C23F 7/06; C23F 7/26
[52] U.S. Cl. ..................................... 148/6.2; 148/6.27; 148/6.3; 427/160
[58] Field of Search ........................ 148/6.2, 6.3, 6.27, 148/6.16; 427/160

[56] References Cited

U.S. PATENT DOCUMENTS 2,544,139  3/1951  Deyrup et al. ........................ 148/6.2

*Primary Examiner*—Ralph S. Kendall
*Attorney, Agent, or Firm*—Browdy and Neimark

[57] ABSTRACT

A selective absorber of solar energy employing an aluminum alloy sheet as a substrate on which a chemical conversion coating is initially formed. The coating is thereafter heat-treated into an oxidized, dark-colored coating of selective solar absorption nature. Also disclosed is a process for producing the absorber. The process comprises a chemical conversion treatment step for formation of the initial coating, and a high-temperature oxidation treatment step for final formation of the selective coating. The latter step includes preventing atmosphere in the vicinity of the substrate surface from circulating.

14 Claims, No Drawings

SELECTIVE ABSORBER OF SOLAR ENERGY AND PROCESS FOR PRODUCING SAME

BACKGROUND OF THE INVENTION

1. Field of the Invention

This invention generally relates to a spectral-selective solar energy absorber or collector and a process for producing the same, and more particularly to a process for easily and economically forming with hgh reproducibility a spectral-selective coating or film on a surface of an aluminum substrate or base material so as to efficiently utilize the solar energy.

2. Description of the Prior Art

With the recent oil crisis as a turning point, an aggravating exhaustion of energy resources, particularly fuel oil, has been increasingly a serious problem, which has necessitated and accelerated the pace of various efforts and research directed toward maximum utilization of all energy resources available in many different forms. Among the presently available energy resources, solar energy or heat has been and is considered to be one of the most easily or readily usable energy sources available anywhere on the earth, and thus there is demand to rapidly develop and establish technologies for effective utilization of the solar energy. The solar energy is generally obtained in the form of heat usually absorbed by a black or dark-colored surface of a body, for example, a surface coated with a thin film of a black paint. While such a conventional heat absorbing surface or coating is efficient in terms of selective absorption of solar energy, its high emissivity nature creates a problem of energy loss, i.e., the solar energy or heat absorbed by such a surface tends to be emitted or radiated as infrared rays. This results in the failure in effectively conducting the absorbed solar heat to a suitable medium such as a water, that is the temperature of the water can not be elevated in a sufficiently effective manner by transfer of the heat from the absorbing surface to the water. Thus, the conventional solar energy absorbing surface with a black paint coating per se is limited in its application and therefore suffers a potential disadvantage of being incapable of efficiently utilizing the solar energy.

To solve the above indicated problem and disadvantage, it is an important requirement to develop a spectral-selective solar energy absorbing surface or absorber which is characterized by its high absorptance of the solar energy, particularly in the visible and near-infrared regions which are a major portion of the solar spectrum, as well as by its low emissivity in the long wavelength (infrared) region, the said selective absorber having, in other words, optical properties which assure efficient absorption of the solar light (high solar absorptance nature) and less thermal emission from the absorbing surface (low thermal emissivity nature).

As a result of extensive study and research of a selective coating or film, made under such situation, the inventors of the present invention and coworkers had found novel processes usable for forming, on a substrate of an aluminum material, black coatings which are capable of efficient selective absorption of the solar energy, for which Japanese patent applications were filed as TOKU-GAN-SHO 53-62480 and 54-15900 (respectively published as TOKU-KAI-SHO 54-153348 and 55-107856). The process which is the subject matter of the latter application, comprises a step of subjecting a smooth surface of a magnesium (Mg)-containing aluminum (Al) alloy material to a chemical conversion treatment to form thereon a chemical conversion coating containing chromium (Cr), and a subsequent step of subjecting the Al alloy material to an oxidation treatment at a temperature of 400°–600° C. in order to finally form an oxidized coating on the surface of the alloy, thereby making it possible to easily and economically forming an oxidized, dark-colored coating that demonstrates excellent properties of solar absorptance and specular reflectance, and provides an increased efficiency in selective absorption of the solar energy.

While the above described process has such excellent features, the inventor of the present invention who made further study and research on such oxidized, dark-colored coatings for more improvement of the process for forming the same under various conditions, found that the surface of the Al alloy material subjected to the chemical conversion treatment could not always be sufficiently colored, i.e., not blackened as intended, through the final oxidation treatment at a high temperature. Thus, it became clear that the previously indicated process had such disadvantage that would reduce the benefits arising out of its advantage of being high in reproducibility. To adapt the above process to use for industrial production, accordingly, it has been desired and is preferred to employ a suitable method for overcoming the inherent problem of insufficient coloration during the high-temperature oxidation treatment of the process and thereby forming with increased reproducibility well blackened or sufficiently dark-colored, oxidized coatings on the surface of the aluminum alloy substrate.

SUMMARY OF THE INVENTION

In light of the above mentioned problem, the inventor made further study and research with respect to a method of the high-temperature oxidation treatment, and as a result, found the fact that atmosphere within a heating furnace used for such oxidation treatment was usually positively circulated as with a fan mainly for the purpose of increasing the heating efficiency and obtaining even distribution of heat throughout the surface of the material to be processed, and that this circulation of air within the furnace had a great adverse effect upon the coloration or blackening of the oxidized coating formed on the material surface. The inventor successfully evolved this knowledge into a novel idea that it was necessary to carry out the high-temperature oxidation treatment without a possible circulation or flow of atmosphere within the heating furnace, at least in the vicinity of the material surface to be heated, so as to ensure an effective, stable and highly reproducible coloration of the material during the oxidation treatment. Thus, the invention has been completed.

It is accordingly the primary object of the present invention to provide a spectral-selective solar energy absorbing surface or absorber having an increased efficiency in selective solar energy absorption.

It is an object of the present invention to provide an improved process for consistently and uniformly manufacturing with high reproducibility a spectral-selective solar energy absorbing surface or absorber having an efficient selective solar energy absorption nature.

It is another object of the present invention to provide a process for easily and economically forming with high reproducibility a selective coating or film on a surface of an aluminum substrate or base material so as to efficiently utilize the solar energy.

It is a further object of the present invention to provide a process for producing a selective solar energy absorber without a considerable amount of work for pretreating a surface of an aluminum material used as a substrate.

Other objects of the inventin will become apparent from the following detailed description.

To attain the above objects, the present invention is characterized in that a smooth surface of an aluminum (Al) alloy containing magnesium (Mg) is first chemically treated to form thereon a chemical conversion coating including chromium (Cr), and then the Al alloy is subjected to an oxidation treatment at an elevated temperature ranging from 400° to 600° C. without a positive circulation or flow of atmosphere at least in the vicinity of the Al alloy in order to convert the previously formed chemical conversion coating into an oxidized, dark-colored coating, whereby selective solar absorbers with an increased selective solar absorptance may be obtained economically with ease of processing and high reproducibility.

Thus, in accordance with this invention, the chemical conversion treatment of the aluminum material surface, the subsequent high-temperature oxidation treatment of the same under the condition free from an influence of the flow of atmosphere within the furnace, and the resultant action of the magnesium contained in the material itself and the chromium introduced during the chemical conversion treatment, permit consistent and stable formation of well blackened selective coatings, i.e., reproduction of uniformly black or dark-colored (colors having a hue nearest to black) coatings having an extremely high solar absorptance and an extremely low emissivity in the infrared region of the solar spectrum. The selective absorbers possessing such excellent selective coating may be sufficiently provided by means of using, as a substrate, aluminum alloy sheets whose surface has such sufficient degree of smoothness and brightness that may be obtained without having to specially adjust the reflectance of the surface to the conventional standard of higher than 98%, whereby the production process may be significantly simplified.

DETAILED DESCRIPTION OF THE INVENTION

The substrates used in accordance with this invention are Al alloy materials containing Mg, the Mg content generally ranging from about 0.1 to several percentages or exceeding the latter value as the case may be. The oxidized coating obtained through the later described oxidation treatment at a high temperature will become darker in color and better in quality as the Mg content in relation to the Cr content is increased. However, since materials generally become harder and their processability is reduced as the Mg content thereof is increased, the Al alloy materials as a substrate have their own upper limit of the Mg content which varies depending upon a degree of processability required by specific Al alloy materials. Notwithstanding the above presumption, the present invention enables a substrate of Al alloy material with a comparatively small Mg content, say lower than about 5%, specifically about 3%, to be provided with a dark-colored efficient selective coating thanks to an outstanding feature of the invention that the first formed chemical conversion coating is blackened by means of the interaction between Mg and Cr during the oxidation treatment at an elevated temperature. This is supported by the fact that the materials with less Mg content are accordingly easier to process, and explains the reason why it is possible to use as a substrate bright aluminum alloy material in the as-rolled form, the surface of which is smoothed during cold rolling of the materials into sheets. In this connection, it is recognized that components other than Mg of the Al alloy such as copper (Cu), zinc (Zn) and manganese (Mn) have substantially no effect on formation of a selective coating in accordance with this invention.

Although it has been conventionally a common practice that Al alloy materials as substrates containing Mg must have a smooth surface to provide a selective surface with minimum emissivity ($\epsilon$) in the infrared region, and the surface of the substrate is brightened to obtain such smoothness, the Al alloy substrates for use in accordance with this invention need not be subjected to any special brightening process to meet the conventional critical requirement of keeping the reflectance at a 98% or higher level. The minimum required specular reflectance at a 60-degree incident angle of the substrate surface of this invention is approximately 50% or preferably 60%. Thus, the present invention makes it possible to use as-rolled Al sheets whose surface is brightened and smoothed during the cold rolling process to a satisfactory level of specular reflectance (usually, 60 to 65%). In other words, the present invention has eliminated the conventional need of using special methods for brightening the substrate surface such as buffing, chemical polishing and electrolytic polishing. Of course, the benefit of using such brightening methods is by no means negated in this invention since the emissivity ($\epsilon$) or reflectance of the selective coating of the invention is reduced as the smoothness and brightness of the substrate surface are enhanced. In connection with the use of the brightening methods, the instant invention offers a feature that the substrate surface brightened with such methods will not be adversely affected by subsequent formation of a particular oxidizing coating thereon.

While the magnesium-containing Al alloy material, used as a substrate, is degreased as required depending upon the extent of blur or stain on the surface, it is naturally a must to use a neutral detergent or other non-etching degreasing agent to prevent damaging the bright and smooth surface of the substrate. After the surface is degreased, it is washed in water to rinse out the degreasing agent left thereon.

Following the water rinsing, the cleaned and smooth surface of the Al alloy substrate is chemically treated in accordance with this invention to form a chemical conversion coating thereon. This chemical conversion treatment of the substrate surface is carried out under a chromate or chromate-phosphate process in a commercially available mixture solution known, for example, as Alodine (manufactured by Nippon Paint Co., Ltd.) or Bonderite (manufactured by Nippon Perkerizing Co., Ltd.), containing chromate and/or dichromate and commonly used for preliminary treatment of Al sheets prior to painting the same, thereby forming on the substrate surface a chemical conversion coating which includes chromium (Cr) in the form of chromium oxides or chromium phosphate. In more detail, the chromate process is a process in which a coating is formed chemically by immersing the substrate in a solution whose main component is chromate and/or dichromate, and the chromate-phosphate process is a process in which a coating is formed chemically in an acidic aqueous mixture solution of chromate and phosphate or dichromate and phosphate which mixture solution may contain fluoride. While the required Cr content of the chemical conversion coating may well be almost the same as used in ordinary pre-painting treatments of Al alloy sheets, it is generally preferred that the total Cr content of the coating on the substrate surface be held within an approximate range from 10 to 100 mg per square meter. If the Cr content is less than required, a sufficient effect of the chromium would not be obtained. On the contrary, the chromium has an adverse effect on later described colouration or blackening of the oxidized coating if the Cr content is more than necessary. The Al alloy material, after subjected to such chemical conversion treatment, is rinsed in water to remove the chemical agent adhered to the surface and then air-dried at a room or an elevated temperature to remove the rinsing water off the cleaned surface.

In the next step, the Al alloy substrate containing Mg, on which the chemical conversion coating containing Cr is formed, is subjected to an oxidation treatment at a high temperature of 400° C. or above, so that a black selective coating is finally formed on the substrate surface. This high-temperature oxidation treatment according to the present invention is characterized by the provision for positively preventing a circulation or flow of atmosphere at least in the vicinity of the surface of the Al alloy material. This is suitably attained by using any one of such methods as: (a) wrapping one or more chemically treated Al alloy materials in aluminum or other metallic foils, (b) accommodating the same in stainless steel or other metallic casings, both methods (a) and (b) being intended to prevent a free entry or flow of outside air into the inside of (a space formed within) the metallic foil covering or metallic casing; (c) piling a plurality of such Al alloy materials with a minimum gap from one material to another thereby restraining air in the vicinity of the material surfaces from flowing around; and (d) using a totally enclosed heating furnace to prevent a positive air flow or circulation within the furnace or hold the air entrapped therein. It is practically preferable to use a suitable furnace wherein atmosphere is positively circulated or forced to flow as with a powered fan to ensure an effective heat treatment of the Al alloy materials under even heat distribution over the full area of the surface. In such event, too, the use of the above method (a), (b) or (c) may allow a highly effective and consistent colouration of the material surface during the oxidation treatment, that is, such methods are usable to attain uniform reproduction of dark-colored selective coatings which are consistent in quality. A metallic casing of the method (b) is preferably as small in size as possible to accommodate a specific size of the Al alloy material. While the method (c) is suitably employed when Al alloy materials are sheets, the top sheet of a pile, if processed in an air-circulating type of heating furnace, is exposed to circulated atmosphere within the furnace and thus may not be colored sufficiently black. Of course, such insufficient colouration of the Al alloy sheet atop the pile may be avoided by applying a protective dummy sheet of a sufficient size to the top of the pile or by covering at least a top portion of the pile with a protective cap of a suitable depth. A totally enclosed heating furnace of the method (d) is also preferably as small in size as possible to accommodate the Al alloy materials so that a possible flow of atmosphere due to convection within the furnace may be held to a minimum.

Thus, in accordance with this invention, the consistency or reproducibility of colouration of the Al alloy materials is enhanced by preventing a positive circulation or flow of atmosphere at least in the vicinity of the surface of the material to be subjected to the oxidation treatment at an elevated temperature. Although the reason for the above fact is still unclear, the inventor presumes, in view of the assumption that the colouration of the material through the combined chemical conversion and high-temperature oxidation treatments are achieved by the reaction of the Mg contained in the material and diffused toward its surface during heat application thereto, with the Cr initially introduced during the chemical conversion treatment and subsequently contained in the formed chemical conversion coating, and with oxygen supplied by atmosphere in the heating furnace, that the substantial elimination of air flow above the material surface may restrain a rate of diffusion of the Mg from the inside of the material toward its surface or maintain a constant amount of oxygen necessary for the said reaction, thereby making a certain contribution to the enhancement of consistency or reproducibility in colouring the material during the oxidation treatment within the furnace.

If the oxidation treatment temperature is lower than 400° C., it is difficult to obtain a black coating having an intended selective absorption nature. Further, it must be avoided to perform the oxidation treatment at a temperature exceeding 600° C., which will induce such problems as loss of selective absorption nature of the selective coating, and roughening of the coating surface that may result in loss of relative-specular glossiness and increased thermal emissivity of the selective coating. The preferred range of temperature for the oxidation treatment is from 450° to 550° C. It is generally preferable that the above oxidation treatment at a temperature within such range be continued for a period of more than one minute. The duration of the treatment, however, need not be so long, i.e., about 30 minutes at the longest. Under such high-temperature oxidation treatment process, and by means of the interaction between the magnesium (Mg) contained in the Al alloy material and the chromium (Cr) introduced into the chemical conversion coating during the previously described chemical treatment, a sufficiently dark-colored coating of efficient selective absorption nature may be highly reproducibly formed on the surface of the Al alloy material. More particularly, the additional use of Cr together with Mg allows the coating, under the chemical conversion treatment, to be darker in color and gives better selective thermal absorptance than in the case where Mg in the Al alloy sheet is alone used as a substance which contributes to the oxidation treatment. In this connection, an analysis of the composition of such oxidized coating as obtained in accordance with this invention, reveals that the coating is composed of Al, Mg, Cr, O and other components which are chemically combined. The thickness of such oxidized coating is generally not more than about $1\mu$. A coating of more than about $1\mu$ thickness will have reduced selective solar absorptance.

As disclosed above, the coexistence of the Cr with the Mg in accordance with the invention facilitates formation of extremely efficient spectral-selective coating or film on the surface of a substrate of aluminum alloy materials. Further, according to this invention, selective solar energy absorbers may be reproduced uniformly and consistently in quality by restraining a flow of atmosphere above the surface of the material while it is subjected to the high-temperature oxidation treatment. In addition, a considerable reduction in production cost of the absorbers mainly due to great simplification of the required process, may also attach an outstanding industrial significance to this invention.

The present invention will be more clearly understood with reference to the following examples. These examples, however, are not to be construed to limit the scope of the invention. Unless otherwise specified, percentages given in the examples are to be understood as percent by weight.

EXAMPLE 1

A cold-rolled Al alloy sheet AA5252 (containing 2.5% of Mg and having 60-degree specular reflectance of about 60%), the surface being smoothed during the cold rolling, was firstly degreased with a non-etching degreasing agent Dipsole A1 #47 (available from Tohei Kagaku Co., Ltd.), rinsed in water, and then immersed in a chromate-phosphate based mixture solution of Alodine 401/45 (available from Nippon Paint Co., Ltd.) at 40° C. for a 50-sec. period, so as to form on the surface thereof a chemical conversion coating containing Cr. The total chromium content of the formed coating was 50 mg per square meter.

Then, the Al alloy sheet covered with this chemical conversion coating was rinsed with water, air-dried at a room temperature, and then heat-treated for a 20-min. period in air at 500° C. within a heating furnace wherein the atmosphere is positively circulated with a powered fan. As a result, however, the Al sheet was not sufficiently colored, i.e., the produced absorber sheet was not provided thereon with a sufficiently dark-colored selective coating. This poorly coated Al sheet demonstrated the selective solar absorptance ($\alpha$) of 0.75 and thermal emissivity ($\epsilon$) of 0.30, which were far from the level of enabling the sheet to be used as a selective absorber of solar energy.

On the other hand, a plurality of Al alloy sheets each covered with a similarly formed chemical conversion coating, were rinsed in water, air-dried at a room temperature, piled one on another, wrapped in aluminum foil, and then subjected to the similar high-temperature oxidation treatment within the same heating furnace of air-circulating type. In this case, every sheet was sufficiently dark-colored. Repetition of the same operation showed no insufficiently colored sheets. Thus, it was recognized that Al sheets wrapped in the aluminum foil could be provided with uniform, consistent black selective coatings after the high-temperature oxidation treatment. This coated Al sheet exhibited efficient selective solar energy absorption properties; solar absorptance ($\alpha$)=0.92, thermal emissivity ($\epsilon$)=0.09.

EXAMPLE 2

Al alloy sheets covered with a chemical conversion coating as obtained in Example 1 and not wrapped in aluminum foil, were subjected to the similar high-temperature oxidation treatment as in Example 1, which was carried out in a totally enclosed heating furnace which was not communicated with the outside and wherein the atmosphere was not forcibly circulated. All sheets thus heat-treated were given a consistently or uniformly oxidized, dark-colored coating which showed efficient selective solar energy absorption properties of 0.90 absorptance and 0.10 emissivity.

EXAMPLE 3

Similar experiments as done in Example 1 were repeated, in which the Al alloy sheets subjected to the chemical conversion treatment were not wrapped in aluminum foil but piled in multiple before they were subjected to the subsequent high-temperature oxidation treatment within an air-circulating type of heating furnace. With the exception of one or two poorly colored sheets from the top of the pile, all other sheets thus obtained were provided with a consistently or uniformly oxidized, dark-colored coating which demonstrated efficient selective solar energy absorption properties.

What is claimed is:

1. A process for producing a selective absorber of solar energy, which comprises the steps of subjecting a smooth-surfaced substrate of an aluminum alloy material, containing at least about 0.1% by weight of magnesium and having a specular reflectance of at least 50% at an incident angle of 60°, to a chemical conversion treatment in an aqueous solution containing chromate and/or dichromate to form a chromium-containing chemical conversion coating on a surface of said substrate, and subsequently subjecting the substrate to an oxidation treatment at a temperature of 400°–600° C. and for a time sufficient without a positive circulation of atmosphere at least in the vicinity of said surface to convert said chemical conversion coating into an oxidized, dark-colored coating having high solar absorptance and low thermal emissivity.

2. A process as claimed in claim 1 wherein at least one substrate of said aluminum alloy material subjected to said chemical conversion treatment is wrapped in a metallic foil and/or accommodated in a metallic casing before being subjected to said oxidation treatment in order to prevent a free circulation of atmosphere over the surface of the substrate during the oxidation treatment.

3. A process as claimed in claim 1 wherein a plurality of smooth-surfaced substrates of magnesium-containing aluminum alloy material subjected to said chemical conversion treatment are piled one on another with a minimum gap present therebetween before being subjected to said oxidation treatment.

4. A process as claimed in claim 2 or 3 wherein said oxidation treatment is carried out in a heating furnace in which atmosphere is positively circulated.

5. A process as claimed in claim 1 wherein said oxidation treatment is carried out in a totally enclosed heating furnace in which atmosphere is not positively circulated.

6. A process as claimed in claim 1 wherein said substrate of aluminum alloy material contains 0.1–5 wt% of magnesium.

7. A process as claimed in claim 6 wherein said substrate of aluminum alloy material has about 60% or higher specular reflectance at an incident angle of 60 degrees.

8. A process as claimed in claim 7 wherein said chemical conversion coating formed on the surface of said substrate of aluminum alloy material by said chemical conversion treatment contains chromium in an amount of 10–100 mg per square meter.

9. A process as claimed in claim 1 wherein said oxidation treatment is carried out at a temperature of 450°–550° C.

10. A process as claimed in claim 1 wherein said oxidation treatment is continued for a period of 1–30 minutes.

11. A process as claimed in claim 1 wherein said chemical conversion treatment is carried out in an acidic aqueous solution containing chromate and/or dichromate.

12. A well blackened, selective absorber of solar energy obtained from a smooth-surfaced substrate of an aluminum alloy material containing at least about 0.1% by weight of magnesium, having an oxidized, dark-colored coating having a solar absorptance of at least 0.90 and which is provided by conversion, through an oxidation treatment at a temperature of 400°–600° C. without a positive circulation of atmosphere at least in the vicinity of a surface of said substrate, from a chromium-containing chemical conversion coating which is formed, prior to said oxidation treatment, on said surface by a chemical conversion treatment and which chemical conversion coating has a specular reflectance of at least 50% at an incident angle of 60°.

13. A selective absorber as claimed in claim 12 wherein said chemical conversion coating contains chromium in an amount of 10–100 mg per square meter.

14. A selective absorber as claimed in claim 12 wherein said oxidized, dark-colored coating has a thickness not exceeding $1\mu$.

* * * * *